Sept. 28, 1971 P. CHAMPIGNY 3,608,123

HEADLIGHT WIPER

Filed April 30, 1970

INVENTOR
Patrick CHAMPIGNY
BY
Pierre Lespérance

AGENT

United States Patent Office 3,608,123
Patented Sept. 28, 1971

3,608,123
HEADLIGHT WIPER
Patrick Champigny, 4454 Levesque Blvd., E.,
Laval, Quebec, Canada
Filed Apr. 30, 1970, Ser. No. 33,380
Int. Cl. B60s 1/44
U.S. Cl. 15—250.22     8 Claims

ABSTRACT OF THE DISCLOSURE

An air-driven rotary wiper for removing dirt from an automobile headlight lens comprising a spindle adapted to be attached to the lens, and an air propeller freely rotatable on the spindle and longitudinally displaceable thereon, said propeller having longitudinally curved vanes defining a downstream curved concave surface which is downwardly and rearwardly inclined, each vane having its edge nearer the headlight lens, provided with a series of straight lens contacting wiping blades, each inclined relative to their circular path, so that successive blades along the vane will move in overlapping circular paths to completely clean the lens while moving the same radially outwardly of the lens. The wiper starts to rotate at low automobile speed despite friction of the blades with the lens surface and the blades are applied to the lens surface with a force increasing with the speed of the vehicle, so that efficient cleaning is achieved and a maximum wiper speed is obtained.

---

Figures 1, 2:
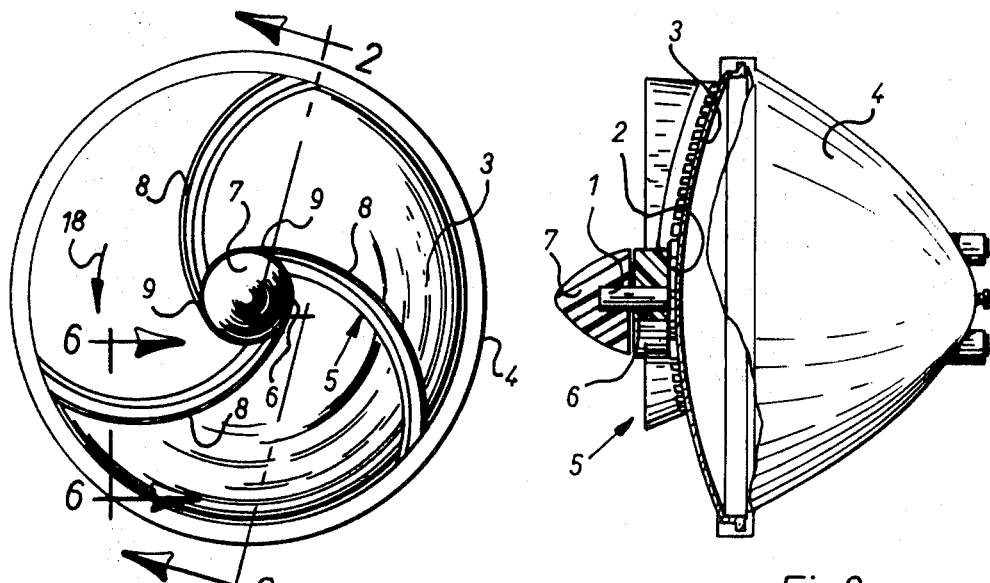

The present invention relates to an automobile headlight wiper of the air-driven rotary type.

Previous proposals for making headlight wipers of the character described have failed to function efficiently for various reasons, the main one being that previous attempts have not provided efficient air-driven propeller-like elements developing sufficient torque to rotate the lens contacting and wiping elements over a broad range of vehicle speeds, while these elements are forced against the lens surface with sufficient pressure to remove dirt and other foreign material which may firmly adhere to the lens.

Previous designs provide either for insufficient frictional contact. In some other known types of such rotary wipers, the vanes of the propeller are so shaped that they tend to exert counterrotating forces on the hub past a certain vehicle speed, resulting in the complete stopping of the device.

In previously known designs, the cleaning efficiency leaves much to be desired, because circular streaks of dirt are left on the lens and also because the dirt is pushed by the wiper elements in a circular path concentric with the axis of rotation of the propeller, resulting in undue accumulation of the dirt in front of the propeller vanes.

It is, therefore, an object of the present invention to overcome the above-noted disadvantages of previous designs and, more particularly, to provide an air-driven wiper element for automobile headlights which cleans the same from a low to high vehicle speed and which operates efficiently even when the headlights are located in recesses of the automobile front, as is commonly found on present-day models.

Another object of the invention resides in the provision of an air-driven rotary wiper for automobile headlights, in which the wiping blades are so designed and so arranged as to remove dirt without leaving streaks on the lens surface and move the dirt radially outwardly of the lens to be discharged at the periphery thereof.

Another object of the invention resides in the provision of a wiper of the character described, in which the vanes and the hub of the wiper element are so shaped that they make very efficient use of the pressure exerted by the air impinging upon and moving across the lens, in front of which the wiper operates.

Figure 3:
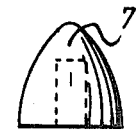
Figures 4, 6:
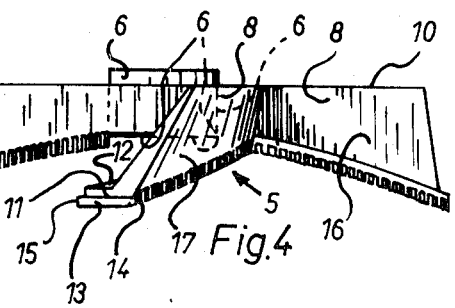
Figures 5, 7:

The foregoing and other objects of the invention will become more apparent during the following disclosure and by referring to the drawings, in which:

FIG. 1 is a front view of the wiper of the invention as applied to an automobile headlight;
FIG. 2 is a cross-section on line 2—2 of FIG. 1;
FIG. 3 is an elevation of the hub cap;
FIG. 4 is a side elevation of the propeller-like wiper;
FIG. 5 is an elevation of the spindle in position on the lens shown broken away;
FIG. 6 is a cross-section on line 6—6 of FIG. 1; and
FIG. 7 is a partial bottom plan view of the rotary wiper.

In the drawings, like reference characters indicate like elements throughout.

The device comprises a spindle 1 having an enlarged base 2 adapted to be secured by adhesive or the like to the central zone of the conventional lens 3 of an automobile headlight 4, said lens 3 being generally of convex shape.

An air-driven propeller-like wiper 5 is freely rotatably mounted on spindle 1. Wiper 5 includes a hub 6 of generally cylindrical shape, which is retained on the spindle 1 by a cap 7 secured on the protruding end of the spindle 1 by an adhesive, by a press fit or the like.

Hub 6 has a smaller thickness than the distance separating base 2 from cap 7, so that the hub is freely longitudinally displaceable on the spindle as well as rotatable thereon. The wiper 5 further comprises three equally angularly spaced vanes 8 having their root portion 9 substantially tangent to, and integral with, the cylindrical surface of hub 6, whereby these root portions are radially outwardly offset from the axis of rotation of the hub. All the vanes are substantially identical, each being longitudinally curved, about an arc of a circle and extending through an angle of about 120° when seen in plan view, such that a radial line through the root 9 of one vane 8 meets the outer end of the adjacent upstream vane.

The front edges 10 of vanes 8 are substantially straight and they all lie in a common plane.

At least one, but preferably each vane 8, has along its back edge, proximate to the lens 3, a base flange 11 extending the entire length of the vane on the downstream side thereof, so as to provide a front surface 12 substantially normal to the direction of the air impinging on the wiper element.

Flange 11 serves also as a backing for a series of wiping blades 13 adapted to contact the lens 3. These wiper blade elements 13 extend in substantially uniformly spaced relation along the entire length of the base flange at the back thereof. Each blade 13 is substantially longitudinally straight and sufficiently thin so as to be flexible. Each blade 13 is inclined with respect to its circular path of rotation in such a manner that its upstream end 14 is at a smaller radial distance from its downstream end 15, such that dirt engaged by each blade will be pushed radially outwardly of the lens. The blades are not all parallel along the vane, being so arranged that they all have substantially equal length. Moreover, to prevent the blades from leaving any streaks on the lens, the downstream end of any given intermediate blade of the series of blades is at a greater radial distance than upstream end of an adjacent radially outer blade, whereby the blades will move in overlapping circular paths.

The blades are thin and flexible and there is sufficient distance between the blades to allow dirt passage therebetween, so as to prevent clogging of these passages.

Each vane 8 is progressively increasing in height from the hub to its radially outer end, so that the flange 11 is curved in an axial direction to conform with the convexity of lens 3, while the wiper blades 13 have all substantially equal height, so as to be substantially equally flexible.

Each vane 8, being longitudinally curved, has a downstream concave surface 16 and a convex upstream surface 17. Surface 16 extends from the front edge 10 down to the flange front surface 12, while convex surface 17 extends from the top edge down to the root of wiping blades 13. Both surfaces 16 and 17 are inclined in a downstream direction from the front edge 10 to the base flange 11.

The propeller is preferably made of synthetic resin with the wiping blade 13 an integral part thereof, the entire propeller being molded in a single piece and having resiliency.

The wiper assembly is easily affixed to the headlight lens 3 in proper center position by using an adhesive between base 2 and lens 3, while centering is achieved by means of the usual equally angularly spaced bosses (not shown) formed at the outside surface of the lens 3 of conventional headlights.

The air impinging on the propeller-like wiper element 5 will cause rotation of the same in the direction of arrow 18 due to the reaction forces exerted on the concave downstream surfaces 16 of the vanes 8. Air impinging on the hub 6 is deflected radially outwardly and moves along the longitudinally curved concave surfaces 16, thereby assisting in the rotation of the propeller wiper. Due to the transversely inclined upstream surface 17, there is a certain vacuum produced on the upstream side of the vanes, again assisting in the efficient rotation of the same. Air directly impinging on the front surface 12 of the base flanges is partially deflected in the upstream direction against the downstream concave surface 16, again assisting in the efficient rotation of the wiper 5. Simultaneously, the axial force exerted by the impinging air on the front surfaces 12 of the base flange 11 causes application of the wiping blades 13 with sufficient pressure on the lens 3 for efficient cleaning thereof. The fact that the root 9 of each vane 8 is tangent with the peripheral surface of hub 6 instead of being radial with axis of rotation of the hub, again assists in the efficient rotation of the wiper 5.

It will be appreciated, from a look of FIG. 1, that all the air deflected radially outwardly by the frusto-conical cap 7 will hit or impinge on the concave downstream surface 16 of the vanes 8. This follows from the fact that radial line extending across the root 9 of one blade hits the outer end portion of the next upstream vane 8.

Actual tests carried out with the system of the invention have shown that the impeller starts to rotate at about a vehicle speed of 5 to 6 miles per hour and increases its rotational speed with increase of the vehicle speed up to a maximum speed of rotation which is attained at about 50 miles per hour, depending on conditions. Further increase of the vehicle speed simply causes increased axial movement of the hub 6 on the spindle 5 and consequent greater friction between the lens 3 and the wiping blade 13.

The dirt is removed without leaving any streaks, because the edges of the wiper blade elements 13 are radially overlapped and because the wiper blade elements are sufficiently flexible to move over indicia bosses and the like which might protrude from the lens surface.

All of the dirt is gradually moved radially outwardly to fall at the outside periphery of the lens 3. Because the wiper 5 and its wiper blade 13 are made of a one-piece molded unit of synthetic resin, the assembly is very inexpensible to manufacture.

The wiper system of the invention has been found to be very efficient, even when used on present-day automobiles wherein the headlights are recessed within the front part of hood.

What I claim is:

1. An air-driven rotary wiper for removing dirt from automobile headlight convex lens surface, comprising a spindle adapted to be attached to said lens surface in a position normal thereto, an air-driven propeller-like wiper element comprising a hub freely rotatably mounted on said spindle and vanes joined to said hub and outwardly extending therefrom, said vanes longitudinally curved to present a longitudinally concave surface at the downstream side thereof, each vane having a front edge and a back edge, the latter adapted to be closer to the lens surface, each vane having its downstream concave surface transversely inclined in the downstream direction from said front edge to said back edge, a base flange formed along the back edge of at least one of the vanes and longitudinally curved in the axial direction to conform to the lens convex surface, and a series of lens contacting wiping blades protruding from said base flange and made of flexible material.

2. An air-driven rotary wiper as claimed in claim 1, further including a cap fitted on the end portion of said spindle protruding from said hub to retain said hub on said spindle while allowing longitudinal displacement of said hub on said spindle, said cap having a generally frusto-conical shape to deflect air impinging thereon in a radially outward direction.

3. An air-driven rotary wiper as claimed in claim 1, wherein each wiping blade is integrally formed with said base flange.

4. An air-driven rotary wiper as claimed in claim 1, 2 or 3, wherein the tangent of each vane at its junction with said hub is eccentric with respect to the axis of rotation of the hub, and a radial line from said axis of rotation through said junction of a vane meets the outer end portion of an upstream vane.

5. An air-driven rotary wiper as claimed in claim 1, 2 or 3, wherein each wiping blade is longitudinally substantially straight and each has an upstream end and a downstream end, the downstream end of any given intermediate blade of the series of blades being at a greater radial distance than the upstream end of an adjacent radially outer blade, so that the various blades travel in overlapping circular paths and move dirt or other foreign material radially outwardly of the lens.

6. An air-driven rotary wiper as claimed in claim 1, wherein each vane has a convex upstream surface longitudinally of the vane, said upstream surface being transversely inclined from the top edge to the back edge of each vane, said base flanges extending in the downstream direction of the associated vanes.

7. An air-driven rotary wiper as claimed in claim 6, wherein said flanges have an exposed front face at the downstream side of the associated vanes.

8. An air-driven rotary wiper element as claimed in claim 1 or 2, wherein said wiper element is made of resilient material and said wiping blades are an integral part of their associated base flange.

References Cited

UNITED STATES PATENTS

| 2,288,429 | 6/1942 | Baughn | 15—250.22 |
| 2,884,656 | 5/1959 | Bryant | 15—250.22 |
| 3,072,947 | 1/1963 | Bryant | 15—250.22X |
| 3,076,990 | 2/1963 | Dapprich | 15—250.22 |

PETER FELDMAN, Primary Examiner

U.S. Cl. X.R.

15—250.36